United States Patent [19]

Julian et al.

[11] Patent Number: 5,394,793
[45] Date of Patent: Mar. 7, 1995

[54] FOOD PROCESSING SYSTEM WITH ROTATING KNIFE

[75] Inventors: John C. Julian, Richland, Wash.; Kenneth J. Stanley, Aloha, Oreg.

[73] Assignee: Lamb-Weston, Inc., Kennewick, Wash.

[21] Appl. No.: 71,718

[22] Filed: Jun. 2, 1993

[51] Int. Cl.$^6$ .................... A47J 17/00; B26D 3/11; A23L 1/212; A23P 1/00

[52] U.S. Cl. .................... 99/538; 83/865; 83/402; 83/98; 83/932; 99/537

[58] Field of Search .......... 99/485, 495, 509, 537–543, 99/544, 545, 594–599, 636; 83/865, 862, 431, 733, 825.1, 672, 47, 327, 356.3, 932, 402, 409.2, 98

[56] References Cited

U.S. PATENT DOCUMENTS

| | | | |
|---|---|---|---|
| 4,644,838 | 2/1987 | Samson et al. | 83/865 |
| 4,926,726 | 5/1990 | Julian | 83/356.3 |
| 4,979,418 | 12/1990 | Julian et al. | 83/865 |
| 5,042,342 | 8/1991 | Julian | 83/402 |
| 5,089,286 | 2/1992 | Geissler et al. | 99/537 |
| 5,138,940 | 8/1992 | Geissler et al. | 99/538 |
| 5,168,784 | 12/1992 | Foster et al. | 83/932 |
| 5,179,881 | 1/1993 | Frey et al. | 83/402 |
| 5,211,098 | 5/1993 | Mendenhall | 99/538 |

*Primary Examiner*—Timothy F. Simone
*Attorney, Agent, or Firm*—Klarquist Sparkman Campbell Leigh & Whinston

[57] ABSTRACT

A rotary cutting apparatus for slicing food products into pieces such as helical strips includes a rotatable cutter head assembly having a radially extending thrust runner and discharge sleeve through which sliced food pieces are discharged. The cutter head assembly is supported by a plurality of radial motionless ring bearings in bearing contact with an outer periphery of the sleeve and by a plurality of motionless thrust bearings in supportive contact with the thrust runner. Bearing surfaces at the interfaces between the radial and thrust bearings and rotatable cutter head assembly are lubricated by circulating water. The rotatable cutter head assembly and belt drive system which drives the assembly are mounted as a unit on a pivotable frame to allow the combined structure to be pivoted away from a water feed inlet tube which delivers food products to the rotatable cutter head assembly.

12 Claims, 4 Drawing Sheets

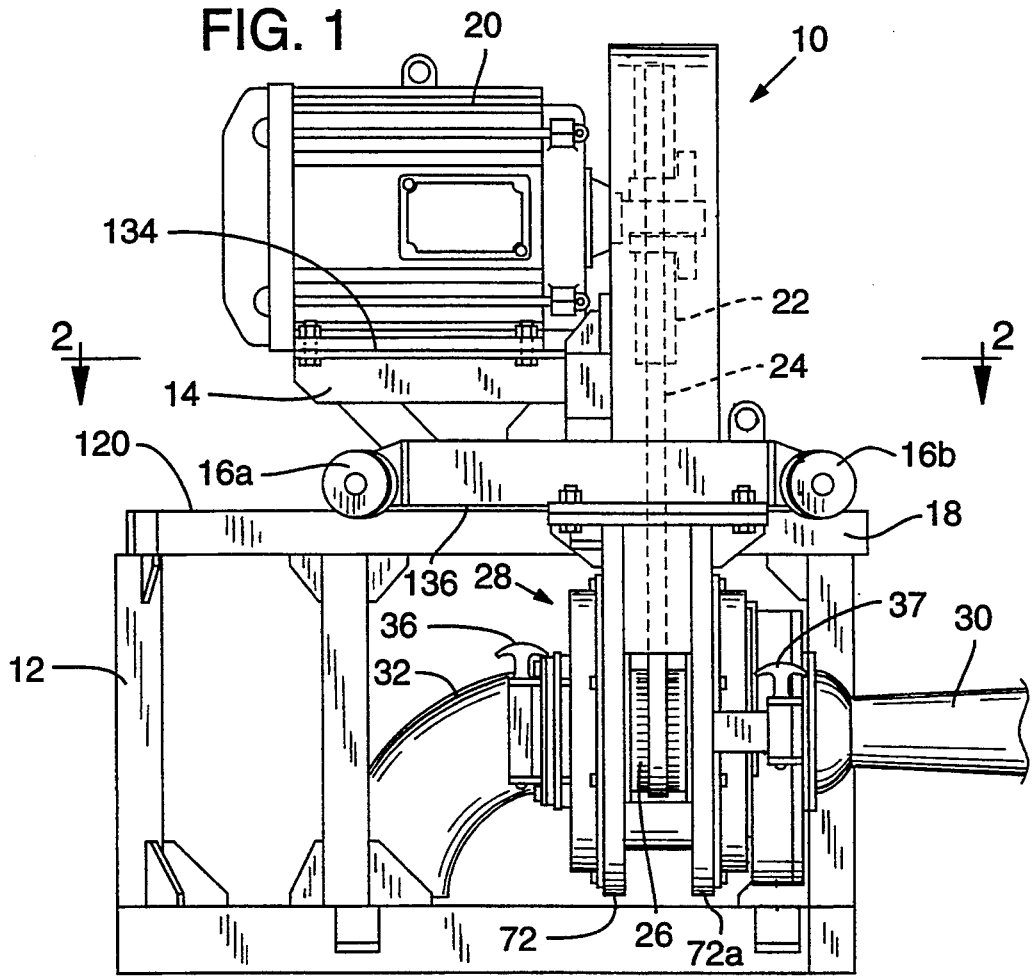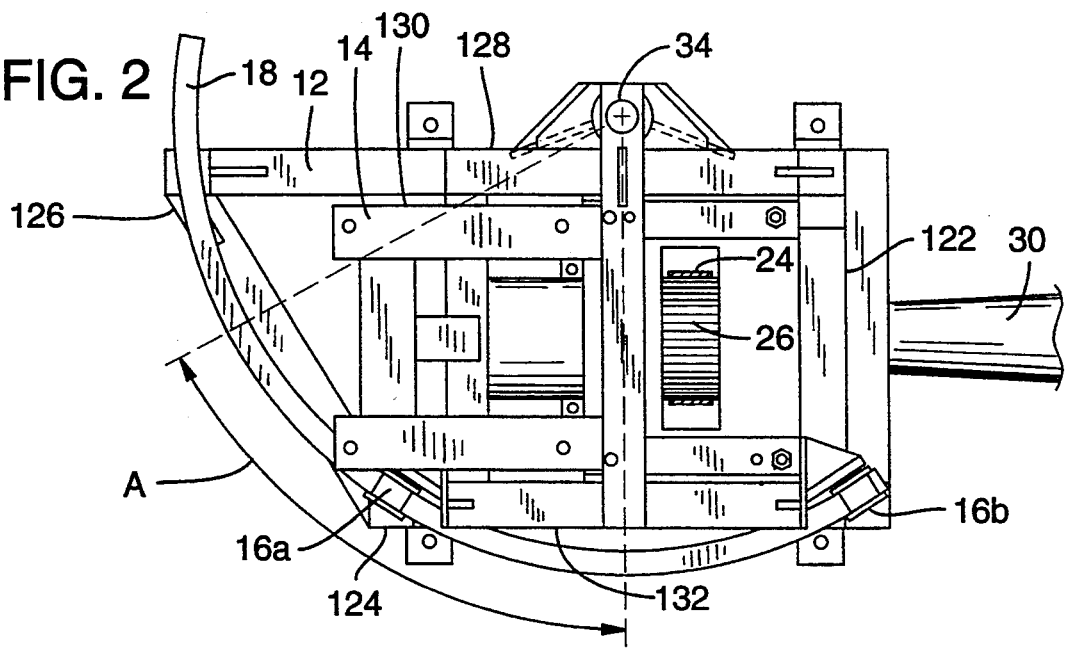

FOOD PROCESSING SYSTEM WITH ROTATING KNIFE

FIELD OF THE INVENTION

The present invention relates to food processing and more particularly to a rotary system for cutting a food item such as a potato into strips or pieces as, for example, helical strips.

BACKGROUND OF THE INVENTION

Helical french fries, or curlicue fries as they are more commonly known, have long been a popular food item. Apparatus suitable for making strips for curlicue french fries have been known for decades. Early devices typically used a simple hand crank mechanism or motor to rotate the potato against a fixed slicing means adapted to slice the potato into helical strips.

More recently, automated commercial equipment has been developed for slicing potatoes into helical strips on a mass production basis. Such commercial equipment typically includes means for feeding non-rotating potatoes into slicing engagement with a rotating knife assembly designed to slice the potatoes into helical strips. See, for example, U.S. Pat. No. 4,644,838 to Samson et al.; U.S. Pat. No. 4,979,418 to Julian et al.; U.S. Pat. No. 4,926,726 to Julian; U.S. Pat. No. 5,042,342 to Julian; U.S. Pat. No. 5,168,784 to Foster et al.; and U.S. Pat. No. 5,179,881 to Frey et al., the teachings of which are herein incorporated by reference.

More specifically, such commercial equipment generally includes a potato conveying system or feed means for transporting the potatoes in singulated fashion to the rotating knife assembly. In the '838, '418 and '726 patents, the conveying system disclosed therein is a mechanical conveying system with moving parts. In the '342, '784 and '881 patents, the conveying system disclosed therein is a hydraulic conveying system or "water gun" which conveys the singulated potatoes in a fast moving water flow to the rotating knife assembly. The potatoes are entrained in the water flow and pumped through an enclosed passageway to the knife assembly.

In the foregoing commercial machines, the rotating knife assembly generally is supported by ball bearings or support rollers, and is driven mechanically by a drive belt or gear mechanism. The '881 machine employs a hydraulically driven turbine to rotate the knife assembly which rides on graphite-copper ring bearings press fit onto the turbine rotor. The bearing surfaces of the ring bearings are lubricated by a circulating stream of water.

One problem associated with ball bearing supported knife assemblies is that the bearings fail relatively frequently and must be replaced. Another problem is that the ball bearings typically are located near the interior of apparatus, requiring a significant amount of time to dismantle the equipment in order to replace the bearings. Both problems result in relatively high equipment down-time and expense.

While the '881 apparatus avoids the use of ball bearings to support the rotating knife assembly, it appears to be designed to channel lubricating water past the graphite-copper bearing surfaces, which are subject to wear, to the interior of the knife assembly. Thus, the possibility exists that graphite-copper particles sloughing off the bearing surfaces may enter the downstream flow of helical strips. In addition, this apparatus appears to require a number of valves which must be properly adjusted to maintain optimum performance, thereby adding to the complexity of its operation.

The present invention provides an apparatus for slicing vegetables, such as potatoes and the like, into helical strips or other types of cuts.

One object of the present invention, therefore, is to provide a food slicing system that is relatively simple and efficient.

Another object is to provide a food slicing system that prolongs the life of the bearing system supporting the rotating knife assembly.

Still another object is to provide a food slicing system that is relatively easy to maintain.

Yet another object is to provide a food slicing system with a knife assembly that is easily accessible and removable.

Another object is to provide a food slicing system which is less expensive to manufacture and less likely to break down.

A further object is to provide a food slicing system that eliminates the need for mechanical bearings to support the knife assembly.

Still another object is to provide a food slicing system having a fluid lubrication system which does not intermix with the fluid carrier used to transport cut food pieces.

Yet another object is to provide an improved food slicing system for slicing potatoes and the like into helical strips.

These and other objects, features and advantages of the present invention will be more readily apparent from the following summary and detailed description, which proceeds with reference to the accompanying drawings.

SUMMARY OF THE INVENTION

In one illustrated form of the invention, potatoes are fed into an inlet that is mounted so that its center line is aligned axially with the center line of a rotating knife assembly. The knife assembly preferably includes a helical or helicoidal shaped knife and is adapted to be driven by a motor or other drive means.

The knife assembly also may include a sleeve which threadably mounts the knife and a thrust runner flange extending radially from the knife assembly. The sleeve is supportively engaged by a pair of stationary radial bearings which surround the sleeve. A system of conduits supply water to the interface between the sleeve and radial bearings, thereby creating a water lubricated bearing surface at each interface.

A secondary water bearing support system is provided at the periphery of the thrust runner. A series of stationary thrust bearing pads supported by a stationary thrust bearing support ring supportively engage an inner face of the thrust runner to axially support the knife assembly. Water is supplied via a system of conduits to the interface between the thrust runner and thrust bearing pads, thereby creating a water lubricated bearing surface at each such interface.

A stationary discharge tube may be mounted on an outlet side of the cutting head assembly to receive and discharge the sliced potato pieces. This discharge tube prevents the potato pieces from accumulating and possibly disintegrating inside the cutter head assembly.

BRIEF DESCRIPTION OF THE DRAWINGS

FIG. 1 is a side elevational view of a food processing apparatus according to an illustrated embodiment of the present invention.

FIG. 2 is a sectional plan view taken on line 2—2 of FIG. 1.

DETAILED DESCRIPTION OF A PREFERRED EMBODIMENT

Figure 3:
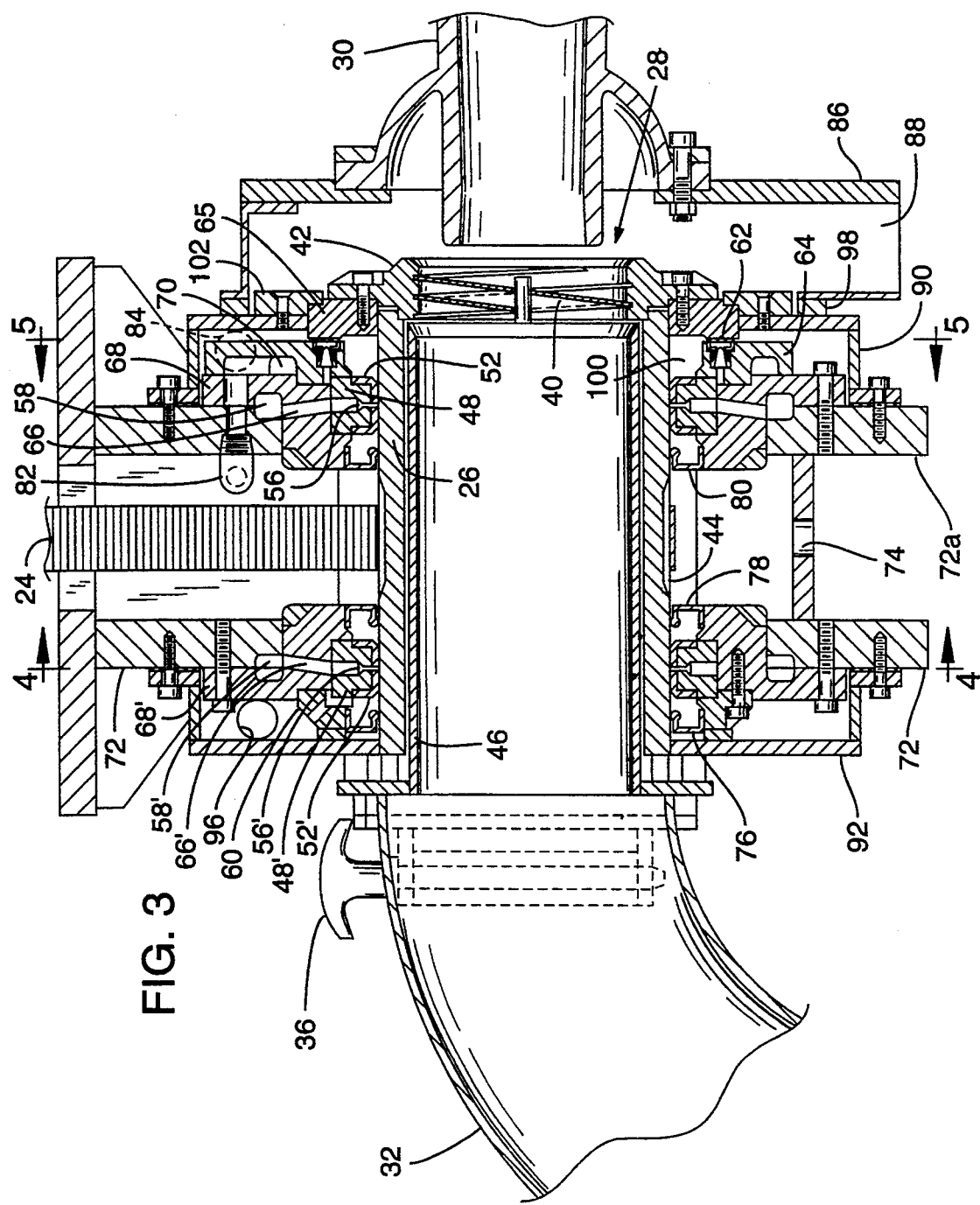
FIG. 3 is an enlarged fragmentary elevational view of the apparatus of FIG. 1 showing the rotary cutting assembly mounting arrangement, with different portions of this view taken on different radial planes for purposes of illustration.

An illustrated embodiment of the present invention is described and shown in the context of a food processing system adapted to slice potatoes into helical strips. It will be appreciated, however, that the present invention can be used, or adapted as necessary, to slice vegetables besides potatoes and other food products into helical strips. It also can be used to slice food products into other pieces or strips besides helical strips by, for example, using a different style slicing knife or feeding the food products off center to the knife assembly.

With reference to FIGS. 1 and 2, a food processing apparatus 10 in accordance with an illustrated embodiment of the present invention includes a fixed frame 12 and a pivotable frame 14 supported thereon. Both frames serve to support various components of the present invention above the ground. The frames are constructed of structural members which are fastened or otherwise secured together in a conventional manner.

Fixed frame 12 has a front portion 122, opposed first and second side portions 124, 128, back portion 126, and upper surface 120 to which a single arcuate rail 18 is mounted. Rail 18 extends in a circular arc of about 120 degrees from front portion 122 to back portion 126.

Frame 14 is pivotally mounted to fixed frame 12 by a vertical pivot pin 34 located within a sleeve means just outboard of second side portion 128. Pin 34 is located an equal radial distance from all points along rail 18. Frame 14 is supported by rollers 16a, 16b which ride on rail 18, enabling frame 14 and the components carried thereon to pivot in a horizontal plane between a first position proximate to front portion 122 and a second position proximate to back portion 126, as illustrated schematically by arrow A in FIG. 2.

In the preferred embodiment, frame 14 supports both a rotatable slicing assembly capable of slicing the potatoes into helical strips and a drive system for rotating the slicing assembly. The drive system may include an electric motor 20, pulley 22 coupled to the motor, and drive belt 24 engaged by the pulley. These components are supported by the pivot frame above upper surface portion 120 in any conventional manner. The drive system serves to rotate the rotatable slicing assembly in a manner described below. Alternative mechanical or hydraulic drive means may be used in place of the drive belt system illustrated.

The slicing assembly, which is supported by the pivotable frame below upper surface portion 120, includes a cutter head assembly 28 mounted between a food product inlet tube 30 and a discharge chute 32. Cutter head assembly 28 includes a cylindrical sleeve 26 which is drivingly engaged by belt 24. The discharge chute 32 is detachably coupled to the cutter head assembly by a lock pin assembly 36 (FIG. 1). Similarly, inlet tube 30 is detachably coupled to the cutter head assembly by a lock pin assembly 37 (FIG. 1). The sleeve preferably is made of stainless steel with a hard chrome coating.

As FIG. 2 suggests, with the inlet tube uncoupled, the slicing assembly and drive system carried by frame 14 can be rotated as a unit about pivot pin 34 away from the inlet tube, thereby allowing direct access to the cutter head assembly for maintenance and inspection. In FIG. 2, arrow A illustrates the angular range of motion of frame 14 to be about sixty degrees.

Referring now to FIG. 3, inlet tube 30 directs the singulated potatoes and water flow toward the cutter head assembly which includes a knife blade 40, knife holder 42, thrust runner 65 and sleeve 26. Knife blade 40 preferably has a helical or helicoidal configuration which allows it to be removably mounted to holder 40 by screwing it into a threaded inner bore wall of holder 42. The pitch of the threaded inner bore wall corresponds to the pitch of the outer helical periphery of blade 40 to facilitate the threaded relationship therebetween, as shown in U.S. Pat. Nos. 4,979,418 and 4,926,726. It will be appreciated that other types of blades and blade mounting arrangements, such as non-helicoidal blades, can be employed as well.

Holder 42 in turn is attached by fasteners to a ring-like flange or thrust runner 65 which is welded to the upstream end of sleeve 26. The rotatable cutter head assembly, including the thrust runner, is retained in place by a fixed thrust runner retainer ring 102 which is notched to radially overlap and retain the thrust runner. The thrust runner retainer ring is detachably fastened by screws or other fastening means to an inlet face shroud 90 which in turn is detachably fastened to a lower support plate 72a of pivotable frame 14. Support plate 72a has a central opening to allow the rotatable cutter head assembly to extend therethrough.

The cutter head assembly is supported by a non-mechanical bearing support system including both radial bearing means and thrust bearing means which serve to retain the cutter head assembly in place while counteracting radial and axial forces acting on the cutter head assembly. More specifically, the bearing support system serves to support the weight of the cutter head assembly, to resist any tendency of the cutter head assembly to wobble as it rotates about its longitudinal axis of rotation, to counteract the side loading (radially directed forces) of drive belt 24, and to counteract axial and radial forces caused by the potatoes and water flow impacting against the upstream end of the cutter head and traveling through the cutter head assembly as the potatoes are sliced.

The radial bearing means includes a front ring bearing 48 and a back ring bearing 48', both of which surround sleeve 26 on opposite sides of drive belt 24. Bearings 48, 48', which preferably are made of metal such as stainless steel (300 series), each have respective bearing surfaces 52, 52', of U-shaped cross section. Bearing surfaces 52, 52' are made of a hard rubber or other elastomeric material such as carboxylated nitril. The metal portion of each ring bearing and bearing surface preferably are bonded together in a nesting manner to form a construction of substantially square cross section along at least a portion of the bearing's circumference. Bearings 48, 48' are each retained in place by a respective bearing support ring 68, 68' which in turn is fastened by screws or other fastening means to one of two respective lower support plates 72, 72a of pivotable frame 14.

It is preferable to have at least two radial bearings supporting the cutter head assembly, one on each side of the drive belt to provide a balanced support system for the cutter head assembly. Spacing each bearing at least a few inches from the drive belt further promotes stability.

The thrust bearing means includes a plurality of discrete, circumferentially spaced thrust bearing pads 62 which engage an axially downstream facing surface of thrust runner 65. Thrust bearing pads 62 preferably have a mushroom-like configuration with a flat top and are made of hard rubber or other elastomeric material such as carboxylated nitril. The thrust bearing pads are retained in place by a thrust bearing support ring 64 which in turn is affixed by press fitting to bearing support ring 68. Support ring 64 has a plurality of openings, each of which receives one of the thrust bearing pads. Support ring 64 also cooperates with support ring 68 to form a circumferential channel to retain ring bearing 48 in place.

With the cutter head assembly supported by the bearing arrangement as just described, the cutter head assembly is free to rotate about a longitudinal center axis coincident with the longitudinal center axis of sleeve 26, knife blade 40, holder 42, thrust runner 65, and inlet tube 30. The cutter head assembly is rotated by ribbed drive belt 24 which engages a corresponding ribbed midsection portion 44 of sleeve 26. In a preferred embodiment, midsection 44 has circumferentially spaced ribs oriented parallel to the rotational axis of sleeve 26 to mesh with belt 24. It will be appreciated that other types of drive means, such as gear drives, chain drives, hydraulic drives or the like, also can be used to rotate the cutter head assembly.

The foregoing thrust and radial bearings both can be characterized as a "water bearings" because they each employ one or more fixed bearing surfaces which are lubricated by water to form a hydroplane-like lubricating film between the bearing surface and cutter head assembly. The manner in which the radial bearings are lubricated will now be described with reference to the back radial bearing 48', the front radial bearing 48 having essentially the same construction and operation.

Figure 4:
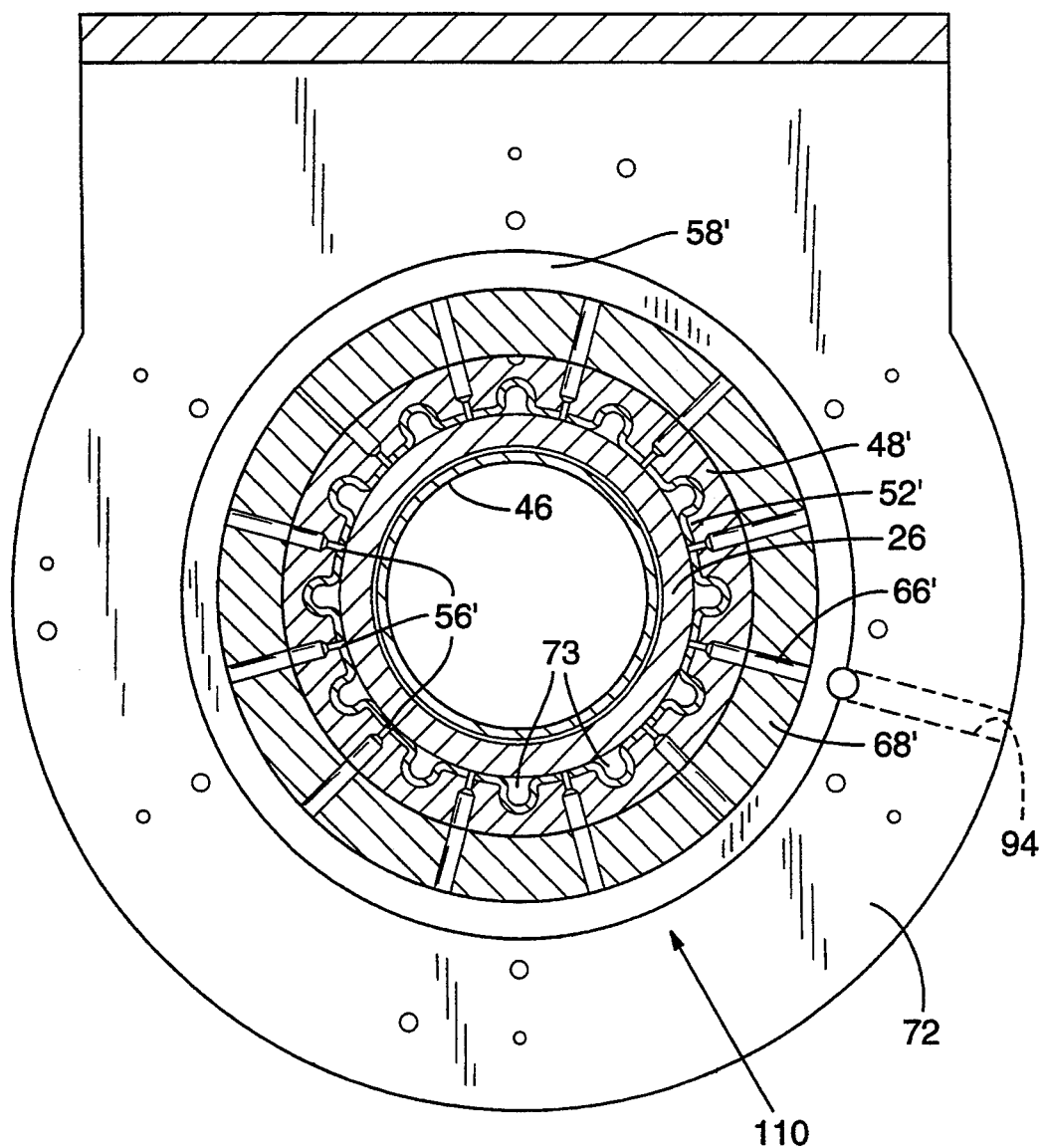
FIG. 4 is a sectional view taken on line 4—4 of FIG. 3 showing a radial bearing means.
Figure 5:
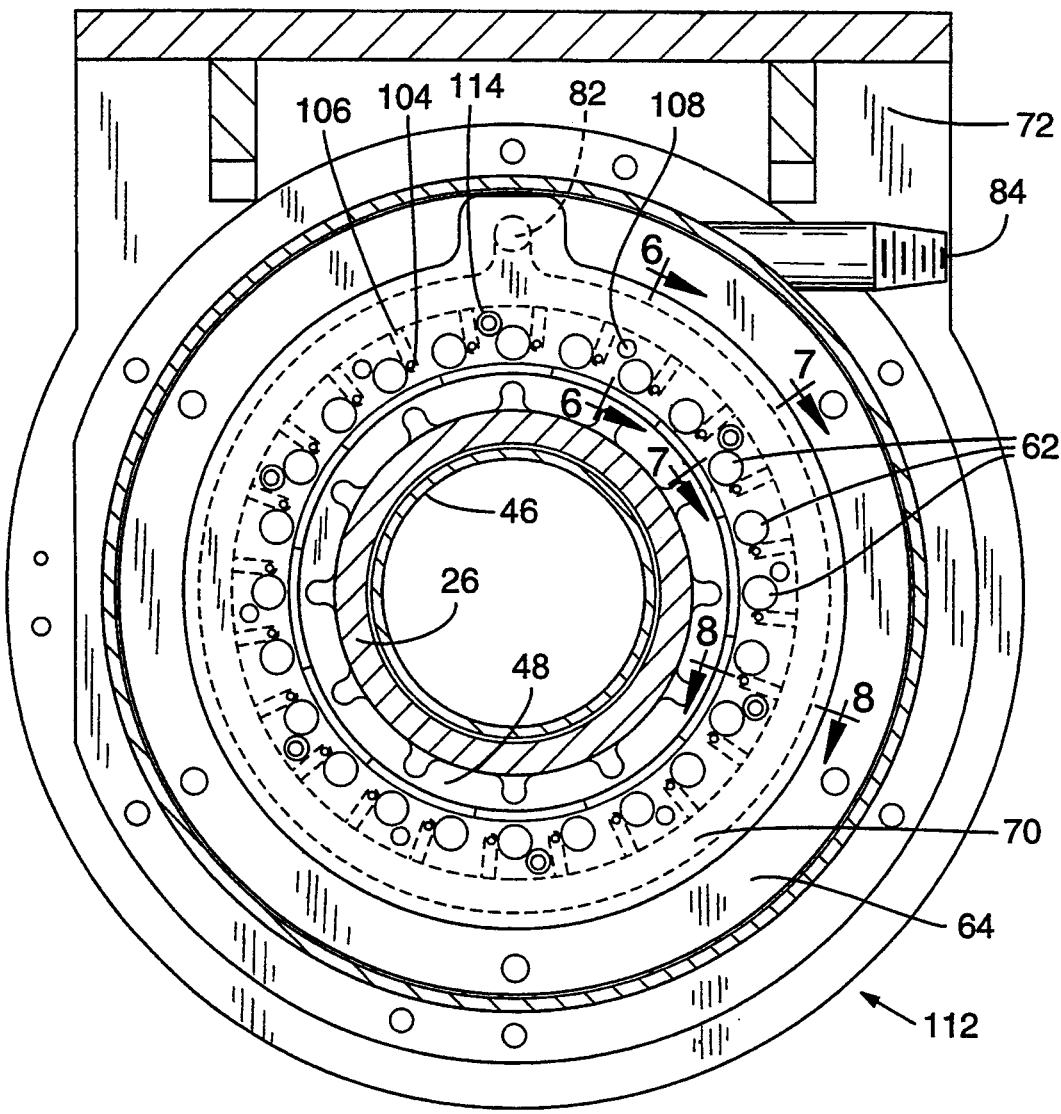
FIG. 5 is a sectional view taken on line 5—5 of FIG. 3 showing a thrust bearing means.
Figure 6:
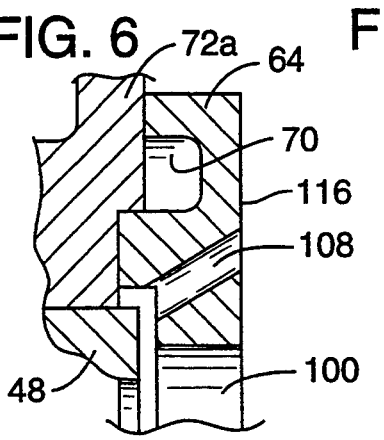
FIG. 6 is an enlarged sectional view taken on line 6—6 of FIG. 5 showing a thrust bearing channel.
Figure 7:
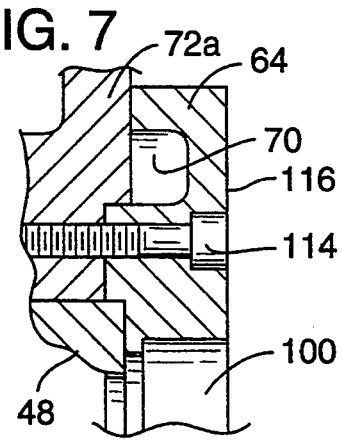
FIG. 7 is an enlarged sectional view taken on line 7—7 of FIG. 5 showing a knife assembly attachment means.
Figure 8:
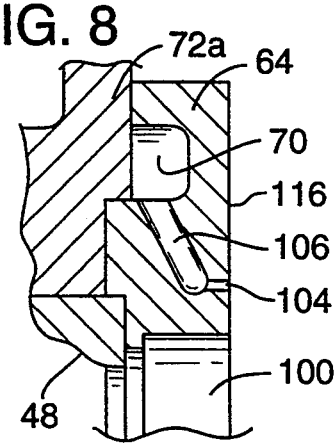
FIG. 8 is an enlarged sectional view taken on line 8—8 of FIG. 5 showing a thrust bearing conduit and outlet.

As shown best in FIGS. 3 and 4, clean water from any conventional source is pumped at a preferred pressure of about 35 to 75 psi, preferably about 50 psi, through an inlet conduit 94 (FIG. 4) to a circumferential channel 58' defined at the interface of plate 72 and support ring 68'. The channel is formed by aligned grooves machined into abutting surfaces of plate 72 and support ring 68'. The water is then fed from channel 58' to a plurality of radially inwardly extending conduits 66' formed in support ring 68' and radial bearing 48'. Conduits 66' terminate at respective exit ports 56' spaced circumferentially around sleeve 26 and located at the interface of bearing surface 52' and sleeve 26. Water exiting exit ports 56' lubricates this interface.

Radial bearings 48', 48 each have circumferentially spaced recesses or pockets 73 (FIG. 4) between adjacent exit ports 56' to allow accumulation of liquid therein. In between the pockets or recesses, the radial bearings each have pad portions in supporting contact with the outer periphery of the sleeve. The foregoing network of conduits and recesses allows water to be deposited evenly on that portion of the bearing surfaces in contact with sleeve 26, creating a fluid lubricating film between the pad portions of radial bearing surface 52' and sleeve 26.

The effectiveness of this lubrication means is enhanced by placing seals on either side of radial bearings 48' to contain the water in the vicinity of the bearing surface. As shown in FIG. 3, a pair of ring seals 76, 78 are located on opposite sides of radial bearing 48' for this purpose, with seal 78 sealing the gap between sleeve 26 and support ring 68' and seal 76 sealing the gap between sleeve 26 and a retainer ring 60 (described below).

The lubrication means for front radial bearing 48 is essentially as just described, with one notable exception. Bearing 48 is provided with only one seal 80 at the downstream side closest to belt 24 to allow water upstream of the bearing 48 to lubricate the adjacent thrust bearing as well. Any water leaking from seals 76, 78 or 80 will enter one of two discharge chambers and ultimately be discharged through either discharge port 74 or discharge port 96.

Referring to FIGS. 3 and 5 to 8, the manner in which thrust bearings 62 are lubricated will now be described. Water is delivered from any conventional source at a preferred pressure of about 35 to 75 psi, preferably about 50 psi, to a thrust bearing assembly 112 (FIG. 5) through a liquid inlet 82. Inlet 82 is in fluid communication with an annular fluid delivery channel 70 defined by support ring 68 and a recessed trough portion or groove machined in support ring 64. From there, the water is forced through a plurality of radially extending, circumferentially spaced, thrust bearing conduits 106 (FIG. 5) formed in support ring 64. Each conduit 106 has an outlet or exit port 104 (FIG. 8) that is positioned to deliver the water to the leading edge of an adjacent thrust bearing pad 62, such that the rotation of thrust runner 65 sweeps water exiting each outlet 104 to the bearing interface between the thrust runner and thrust bearing pad 62 most closely adjacent outlet 104.

The thrust bearing support ring 64 is mounted to lower plate 72a by a plurality of screws 114 (FIG. 7), and serves the additional function of holding radial bearing 48 in place against support ring 68. Thrust bearing support ring 64 also includes a channel 108 (FIG. 6) which provides fluid communication between support ring surface 116 and an annular chamber 100 in order to stabilize any water pressure gradient which might occur between these two areas. The water supplied to the thrust bearing assembly 112 and radial bearing 48 collects in a chamber defined in part by inlet face shroud 90 (FIG. 3) and is removed through a liquid outlet 84 (FIG. 3). Outlet 84, as well as outlet 96, is located above the radial and thrust water bearing support systems so that the radial and thrust bearings are essentially immersed in an enclosed water bath to provide constant and plentiful lubrication to the water bearings.

Again referring to FIG. 3, radial bearing 48' is held in place against support ring 68' by a bearing retainer ring 60 fastened thereto by screws or other fasteners. In serving this function, retainer ring 60 is the counterpart of thrust bearing support ring 64, except that retainer ring 60 does not serve the additional purpose of supporting thrust bearings (as in the case of support ring 64). Retainer ring 60 is located in a water chamber defined in part by an outlet face shroud 92. Some of the lubrication water supplied to radial bearing 48' collects in this chamber and is removed through outlet 96 as described above.

A product discharge system is provided which includes a stationary discharge tube 46 located coaxially within sleeve 26. Tube 46 has an inlet to receive helical strips exiting the knife blade assembly 42 and an outlet just downstream of outlet face shield 92. The discharge system also includes a discharge chute 32 to receive the helical strips and water carrier from the outlet of tube 46. The discharge chute is detachably attached to the pivotable frame by a lock pin 36. Stationary discharge tube 46 serves to prevent the helical strips from accumulating and tumbling within the rotatable cutter head assembly, and thereby breaking up into smaller pieces.

Food product inlet tube 30 is mounted to a shroud or housing 86 secured to fixed frame 12. Tube 30 is positioned so that its center line is aligned axially with the center line of the knife assembly 42. Housing 86 has an inlet ring seal 98 which engages inlet face shroud 90 to form a seal therebetween. Inlet 30 and housing 86 are not fastened to any part of the pivotable frame or cutter head assembly 28 supported thereby, such that when the cutter head assembly is rotated about pivot pin 34 as discussed above, the cutter head assembly rotates away from inlet tube 30 at the point of contact between seal 98 and inlet face shroud 90.

Housing 86 also includes a water discharge opening 88. Some of the water in which the potatoes are transported travels with the potatoes through the cutting head assembly and serves to transport the helical strips downstream for further processing (such as blanching, parfrying, freezing, etc.). The remaining excess water is discharged through opening 88 and may be recycled if desired.

It will be apparent from the foregoing that the cutter head assembly is held securely in place but remains free to rotate about its longitudinal center axis with relatively little resistance. This is accomplished, in part, by non-mechanical water bearings, both radial and thrust, which are lubricated to provide hydroplane-like conditions at the bearing contacts. Expensive ball bearings do not have to be periodically replaced.

The present invention provides for relatively easy and inexpensive maintenance. The cutter head assembly can be pivoted away from the inlet tube to provide easy access thereto. For example, the helicoidal blade can be replaced by unscrewing it from the knife holder. The cutter head assembly can be removed by removing support ring 102, thereby providing access to the thrust bearing pads. The relatively inexpensive thrust bearing pads can be periodically replaced as necessary without having to frequently replace more substantial and expensive structural components such as the thrust bearing support ring. Because bearing surface 52, 52' is bonded to the metal portion of the radial bearings, the entire radial bearing is replaced as a unit when worn.

The water used to lubricate the radial and thrust water bearings is segregated from the water carrier used to deliver the potatoes to the knife assembly and transport the cut helical strips downstream. Thus, lubricating fluid circulated past the bearing surfaces also serves to transport any particles sloughed off by the bearing surfaces to a chamber where the water is drained away from the flow of helical strips.

Having described and illustrated the principles of our invention in an illustrated embodiment, it should be apparent to those skilled in the art that the invention can be modified in arrangement and detail without departing from such principles. For example, although the invention has been described in relationship with a rotary cutting assembly to produce helical cut potato products, it is to be understood that other rotary or reciprocating cutter heads will work as well. Also, other ways of feeding the potatoes or other food products to the cutter head assembly also may be employed. Accordingly, we claim all modifications coming within the scope and spirit of the following claims.

We claim:

1. A rotary cutting apparatus for cutting a food product into pieces comprising:

a rotatable cutter head assembly including a cutting end, a discharge end, a knife mounted proximate the cutting end, and a sleeve having an outer periphery;

a mechanical drive system cooperable with the outer periphery for rotating the cutter head assembly about a longitudinal axis of rotation;

a cutter head support system to support the cutter head assembly while permitting rotation thereof, the support system having at least two motionless radial bearing surfaces which supportively engage the outer periphery on opposite sides of the drive system; and a lubricating system to lubricate the support system by delivering a fluid to the interface between the outer periphery and radial bearing surfaces and then draining the fluid away from the rotatable cutter head assembly, whereby the fluid does not intermix with food products sliced by the rotary cutting apparatus.

2. The apparatus of claim 1 wherein the knife is adapted to slice the food product into helical strips.

3. The apparatus of claim 2 wherein the support system includes at least one motionless axial bearing surface in supportive engagement with the cutter head assembly to provide axial support for the cutter head assembly, the lubricating system delivering a fluid to the interface between the cutter head assembly and axial bearing surface.

4. The apparatus of claim 2 further including a knife assembly having a knife holder for supporting the knife, the knife assembly being coupled to the sleeve for rotation therewith and having a downstream facing surface portion which projects substantially radially outwardly from the sleeve.

5. The apparatus of claim 4 wherein the support system includes a motionless axial bearing surface in supportive engagement with the downstream facing surface portion to provide axial support for the cutter head assembly.

6. The apparatus of claim 1 wherein the drive system includes a drive belt which engages the outer periphery of the sleeve.

7. A rotary cutting apparatus according to claim 1 wherein the support system includes plural fixed radial bearing rings in surrounding supportive contact with the outer periphery of the sleeve.

8. The apparatus of claim 7 wherein each radial bearing ring defines plural fluid conduits terminating at exit ports in fluid communication with the outer periphery.

9. A rotary cutting apparatus according to claim 8 wherein each radial bearing ring has a contoured inner bearing surface including a plurality of circumferentially spaced bearing pad portions in supporting contact with the outer periphery and recesses therebetween.

10. The apparatus of claim 1 wherein the cutter head assembly includes a flange extending substantially radially.

11. The apparatus of claim 10 wherein the support system includes a plurality of motionless thrust bearings in supportive engagement with the flange and a thrust bearing support member to retain the thrust bearings in place.

12. The apparatus of claim 1 further including a feed tube for feeding food products to the cutter head assembly, a first support structure for supporting an outlet of the feed tube in proximate relationship to the cutter head assembly, and a second support structure to support the cutter head assembly and drive system, the second support structure being operable to pivot the cutter head assembly and drive system away from the outlet.

* * * * *

UNITED STATES PATENT AND TRADEMARK OFFICE
CERTIFICATE OF CORRECTION

PATENT NO. : 5,394,793
DATED : March 7, 1995
INVENTOR(S) : John C. Julian, Kenneth J. Stanley and Christian Paraskevakos It is certified that error appears in the above-indentified patent and that said Letters Patent is hereby corrected as shown below:

Cover Page, item [75] "Inventors," should include
--Paraskevakos, Christian, Lincoln County, Rhode Island--.

Signed and Sealed this

Fifth Day of September, 1995

BRUCE LEHMAN

Attest:

Attesting Officer

Commissioner of Patents and Trademarks